United States Patent
Kanai et al.

[11] Patent Number: 5,384,711
[45] Date of Patent: Jan. 24, 1995

[54] METHOD OF AND APPARATUS FOR INSPECTING PATTERN ON PRINTED BOARD

[75] Inventors: Takao Kanai; Hitoshi Atsuta; Yoshinori Sezaki; Ichirou Mandai, all of Kyoto, Japan

[73] Assignee: Dainippon Screen Mfg. Co., Ltd., Kyoto, Japan

[21] Appl. No.: 791,063

[22] Filed: Nov. 12, 1991

[30] Foreign Application Priority Data

Nov. 27, 1990 [JP] Japan .................... 2-327165

[51] Int. Cl.$^6$ .................... G06K 9/62; G06F 15/62
[52] U.S. Cl. .................... 364/489; 364/488; 364/552; 382/8
[58] Field of Search .............. 364/488, 489, 490, 491, 364/552; 382/8

[56] References Cited

U.S. PATENT DOCUMENTS

| | | | |
|---|---|---|---|
| 4,799,175 | 1/1989 | Sano et al. | 364/552 |
| 5,011,960 | 4/1991 | Ando et al. | 356/376 |
| 5,214,712 | 5/1993 | Yamamoto et al. | 382/8 |

FOREIGN PATENT DOCUMENTS

| | | |
|---|---|---|
| 135302 | 3/1985 | European Pat. Off. . |
| 209252 | 1/1987 | European Pat. Off. . |

OTHER PUBLICATIONS

"An Automatic Inspection System for Printed Wiring Board Masks" by Goto et al., Pattern Recognitoin, vol. 12, pp. 443–455.

"An Automatic Optical Printed Circuit Inspection System" by R. C. Restrick, III, SPIE vol. 116, Solid State Imaging Devices (1977), pp. 76–81.

"Automated Optical Inspection of Multilayer Printed Circuit Boards" by W. A. Bentley, SPIE vol. 220, Optics in Metrology and Quality Assurance, 1980, pp. 102–109.

Patent Abstracts of Japan, vol. 014, No. 293 (P-1066) Jun. 25, 1990; JP A 02 091 504, Mar. 30, 1990.

"A Method for PWB Pattern Inspection", Circuit Technology, vol. 3, No. 1, pp. 2–12, 1988, published by Printed Circuit Society, Japan; (Japanese document; only, Abstract in English.)

Primary Examiner—Vincent N. Trans
Attorney, Agent, or Firm—Ostrolenk, Faber, Gerb & Soffen

[57] ABSTRACT

In order to correctly detect the width of wiring pattern on a printed board, a multiple train operator applied to image data. The multiple train operator consists of arms each having three unit arms. The binary data obtained by applying the multiple train operator to the image data is converted into a single horizontal arm and a single vertical arm. The combination of the horizontal and vertical arms corresponds to a single cross operator. The conversion into the single cross operator form is conducted through a logical operation on the binary data obtained by the multiple train operator, so that quantization errors are compensated and fine pattern defects can be detected. As a result, the width of the wiring pattern etc. are correctly obtained.

10 Claims, 17 Drawing Sheets

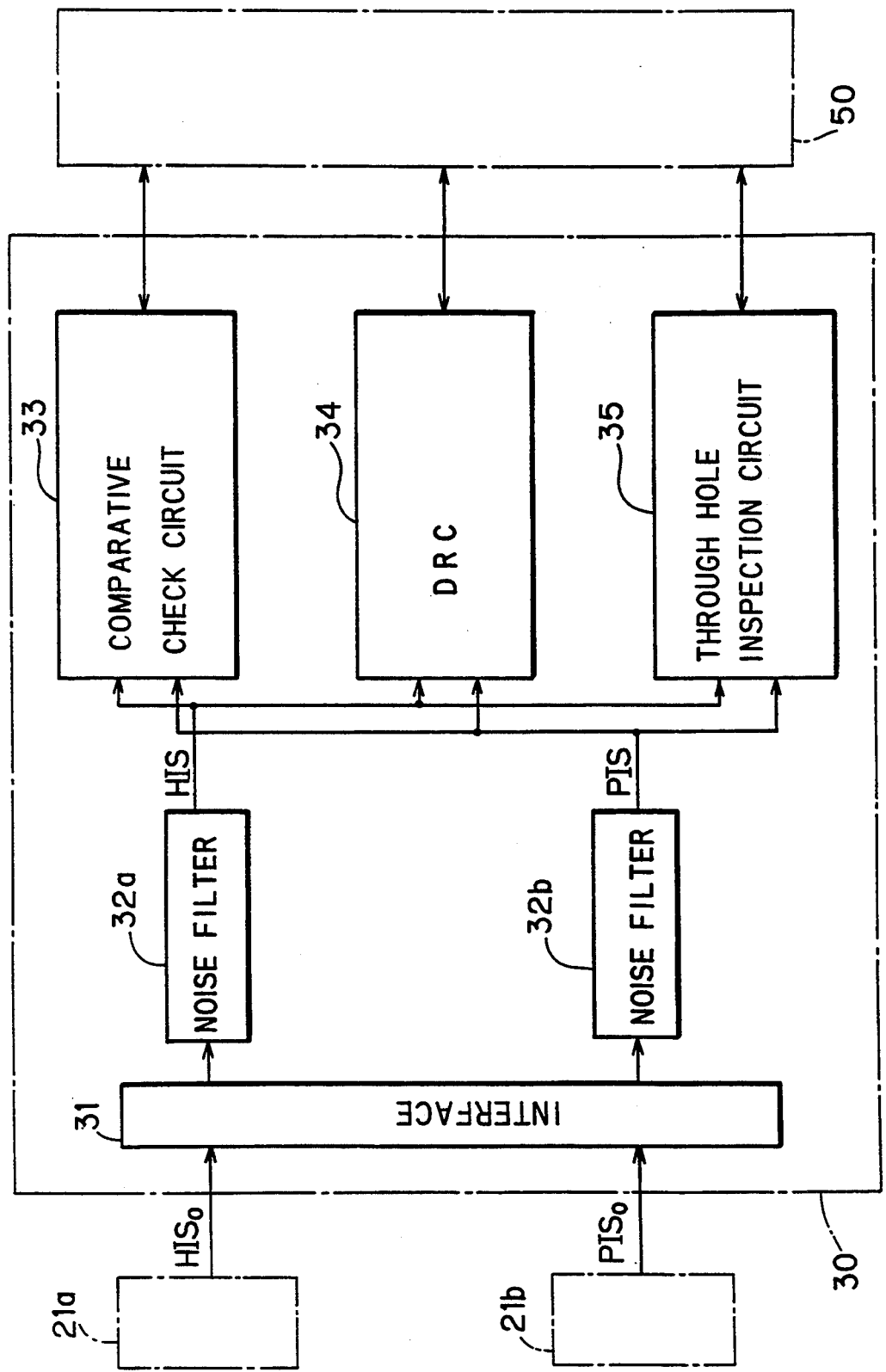

METHOD OF AND APPARATUS FOR INSPECTING PATTERN ON PRINTED BOARD

BACKGROUND OF THE INVENTION

1. Field of the Invention

The present invention relates to a method and an apparatus for inspecting a pattern on a printed board.

2. Description of the Background Art

As electronic parts have been reduced in size and weight and have been improved in performance, the wiring patterns on printed boards have been also highly refined and integrated. Printed boards having narrow wiring lines in wiring patterns and small diameters of through holes are required.

With such narrow line, the inspection and management of the widths, disconnection, or short-circuiting, etc. are regarded as mope important than before.

In optical inspection and management of the wiring pattern, a printed board is photoelectrically scanned to obtain a wiring pattern image of the printed board. The pattern image digitized to obtain image data, which in turn is subjected to various forms of processing for determining whether the pattern is defective or not.

The digitized pattern image has been inspected with a pixel operator, as disclosed in Japanese Patent Laying-Open Gazette No. 59-74627 (1984), for example.

FIGS. 14 to 18 show a cross operator OP as an example of pixel operators, which operator OP has four arms forming a crossing.

In the example shown in FIG. 14, a pair of defects MIS are located in a wiring line pattern L. A vertical arm of the operator OP extends across both defects MIS. The of line L is measured with a horizontal arm of pixels crossing the line L. In the example shown in FIG. 14, the line has a width of 5 pixels at the location of the defects MIS. If the line width is below a prescribed threshold value (e.g., 6), it is determined that the defects MIS exist in the line.

However, it may happen that the detects MIS shown in FIG. 14 are not actual defects but are quantization errors caused at the edges of the line upon digitizing the pattern image.

Further, when a short circuit SC is located obliquely between two vertically running lines L as shown in FIGS. 15 to 17, there will never be a case where all of the pixels on the horizontal arm become "1" as the cross operator OP is moved longitudinally along line L. As such, it is impossible to detect the short circuit SC. Similarly, it is also impossible to detect oblique disconnection or cuts in the line L shown in FIG. 18.

As a result, when inspection is carried out with the conventional cross operator OP, false information may be obtained as to pattern abnormalities in wiring lines.

SUMMARY OF THE INVENTION

The present invention is directed to a method of inspecting a wiring pattern formed on a printed board.

According to the present invention, the method comprises the steps of: (a) obtaining an image of said wiring pattern; (b) applying an image oparator to the image to obtain a first data array, wherein the image operator has a plurality of operator arms each of which is formed of a plurality of pixel trains, and the first data array has a first plurality of data arms each of which is formed of a plurality of trains of data values; (c) converting the first data array into a second data array having a second plurality of data arms each of which is formed of a single train of data values; and (d) inspecting the wiring pattern as a function of the second data array.

Preferably, the image operator is so defined that the plurality of operator arms cross each other at the center of the image operator. In a prescribed embodiment of the present invention, the plurality of operator arms form a radial pattern.

The conversion of the first data array into the second data array may be conducted through the step of applying a logical operation to the plurality of trains of data values to obtain the single train of data values.

In the preferred embodiment of the present invention, a plurality types of logical operation are previously determined. One of the same is selected as a function of a data value at a center of the first data array which corresponds to the center of the image operator. The selected one is used to convert the plurality of trains of data values into the single train of data values.

In the present invention, the first data array obtained by applying the image operator represent not only the pixel data on object pixels but also represent those on the pixels neighbouring the object pixels. This is because each arm in the image operator consists of the plurality of operator arms, and a plurality of pixel trains on the image can be taken into consideration. The first data array converted into the second data array, in which the respective pixel data on the object line and the neighbouring lines are synthesized. Even if minor errors are present on the image data, the errors are compensated through the conversion and do not provide false information on the wiring pattern.

Thus, it is possible to eliminate false information in pattern abnormality and to improve reliability of pattern inspection.

The present invention also provide an apparatus operable to conduct the present method.

Accordingly, an object of the present invention is to provide an improvement in pattern inspection of printed boards in which the pattern inspection is conducted at a high reliability without causing false detection as to pattern defects.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2B is a block diagram showing the structure of a pattern inspection circuit 30;

DESCRIPTION OF THE PREFERRED EMBODIMENTS

A. Overall Structure and Schematic Operation

Figure 2A:
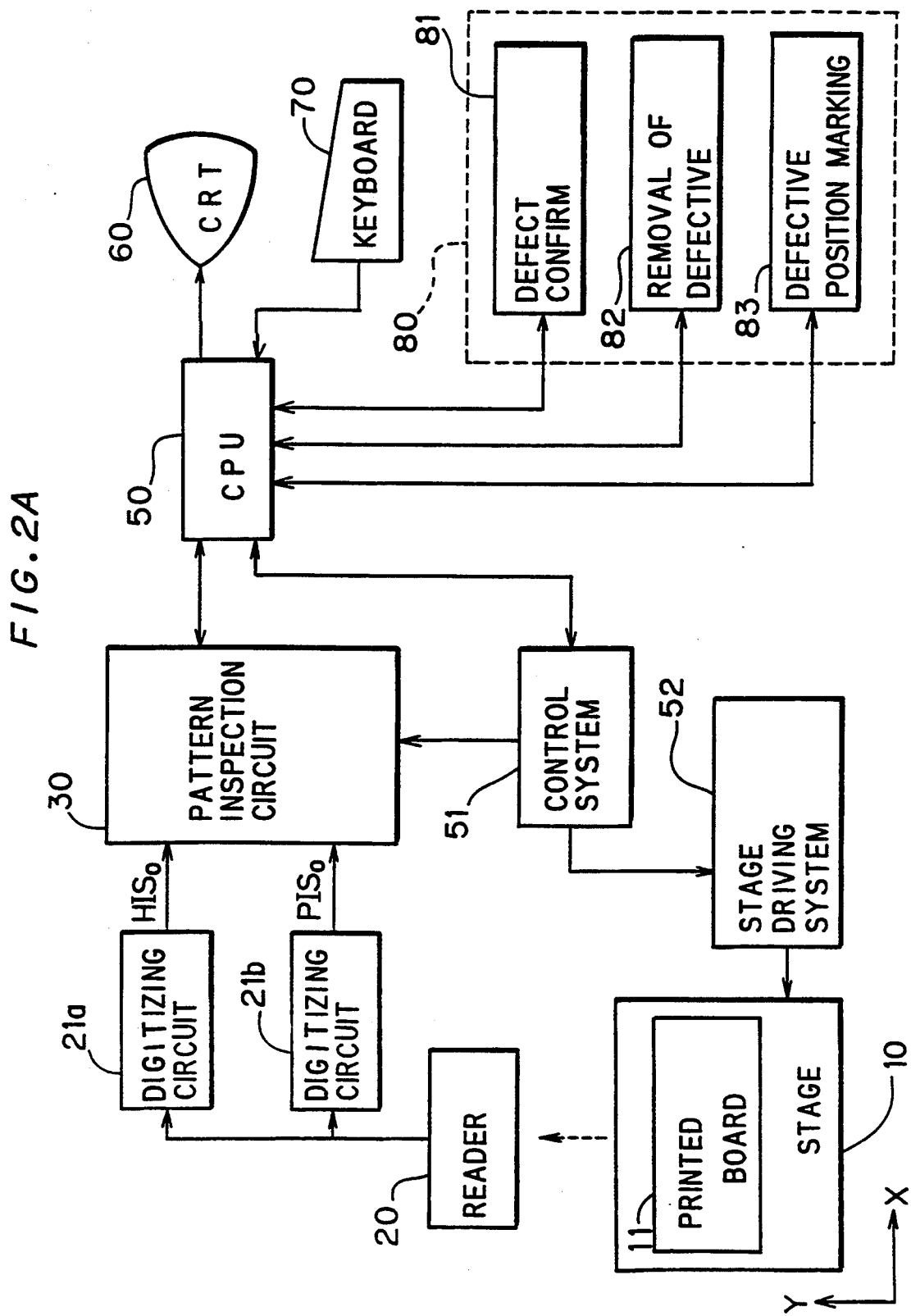
FIG. 2A is a block diagram showing the overall structure of a pattern inspection apparatus according to a preferred embodiment of the present invention.

FIG. 2A is a block diagram showing the overall structure of a pattern inspection apparatus according to a preferred embodiment of the present invention.

A printed board 11 to be inspected is placed on a stage 10. While the printed board 11 is moved in a carriage direction Y, the image of the printed board 11 is read with an image reader 20 for each scanning line defined in the direction X. The image reader 20 has a plurality of CCD linear image sensors each having thousands of elements in the line direction X, and is operable to read the pattern of the printed board 11 for each pixel. The image data obtained in the image reader 20 are fed to digitizing (binarizing) circuits 21a and 21b. The digitizing circuit 21a generates a hole image original signal $HIS_O$ while the digitizing circuit 21b generates a pattern image original signal $PIS_O$, details of which will be described below. Both of the signals $HIS_O$ and $PIS_O$ are applied to a pattern inspection circuit 30.

The pattern inspection circuit 30, which has the function described below, inspects the wiring pattern including lands, and the relative positional relation between the them and through holes. The result of the inspection is delivered to a central processing unit (CPU) 50.

The CPU 50 controls the entire apparatus through a control system 51. The control system 51 generates X-Y addresses for specifying addresses for the image data obtained in the pattern inspection circuit 30 etc. It also supplies the X-Y addresses to a stage driving system 52, to control a carrying mechanism for the stage 10.

A CRT receives signals from the CPU 50 and displays various results of operation such as a hole image. A keyboard 70 is used for inputting various instructions to the CPU 50.

A defect confirming apparatus 81, a defective removing apparatus 82 and a defective position marking apparatus 83, etc., are arranged in an option part 80. The defect confirming apparatus 81 is adapted to display detected defects on the CRT 60 in the form of an enlarged image. The defective removing apparatus 82 is adapted to carry a printed board 11 having a defect to a tray for defective circuit boards. The defective position marking apparatus 83 is adapted to directly mark a defective portion on the printed board 11 or mark a point on a sheet corresponding to the portion. These apparatuses are optional.

B. Optical Reading System

Figure 3A:
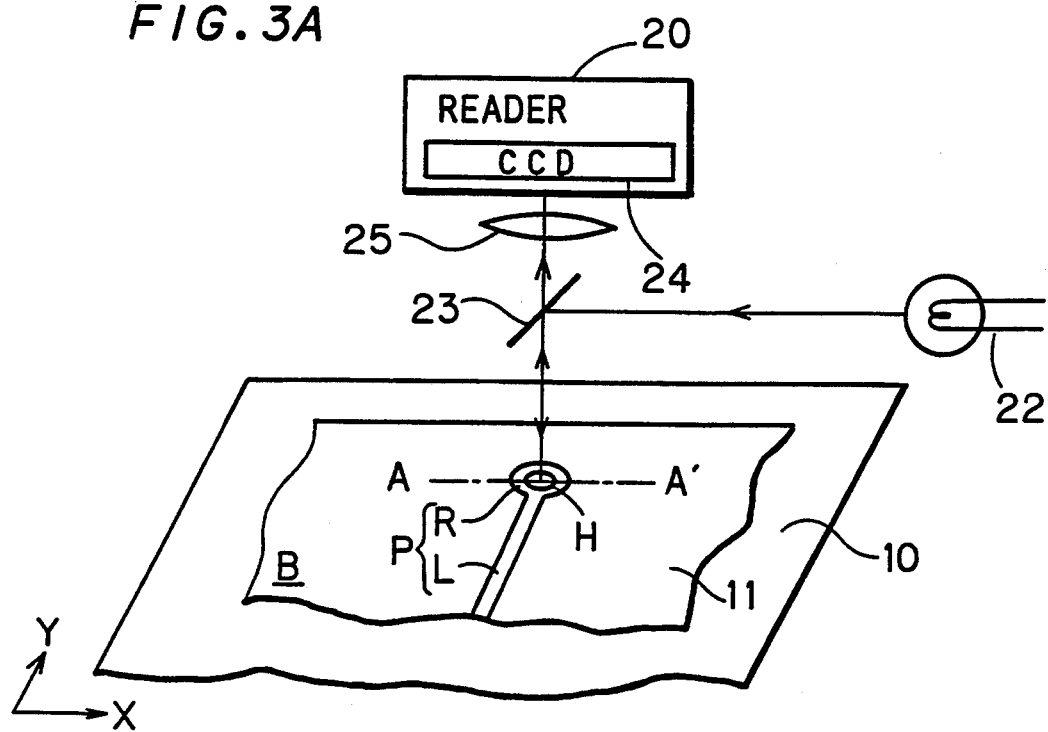
FIGS. 3A and 3B are conceptual diagrams showing image-reading through photoelectric scanning.

FIG. 3A illustrates an example of an optical reading systems which can be employed in the present invention. The optical reading systems comprises the stage 10 sown in FIG. 2A and the image reader 20.

Referring to FIG. 3A, light from a light source 22 is reflected by a half mirror 23, and applied onto the printed board 11 located on the stage 10. The printed board 11 is provided with a base plate B serving as an underlayer, a line L, a through hole H and a land R surrounding the opening of the through hole H. Light reflected from the printed board 11 passes through the half mirror 23, and is incident upon the CCD 24 in the reader 20 through a lens 25. The CCD 24 reads, for each scanning line the reflected light from the base plate B, the line L, the through hole H and the land R on the printed board 11 which is fed in the carriage direction Y.

Figure 4:
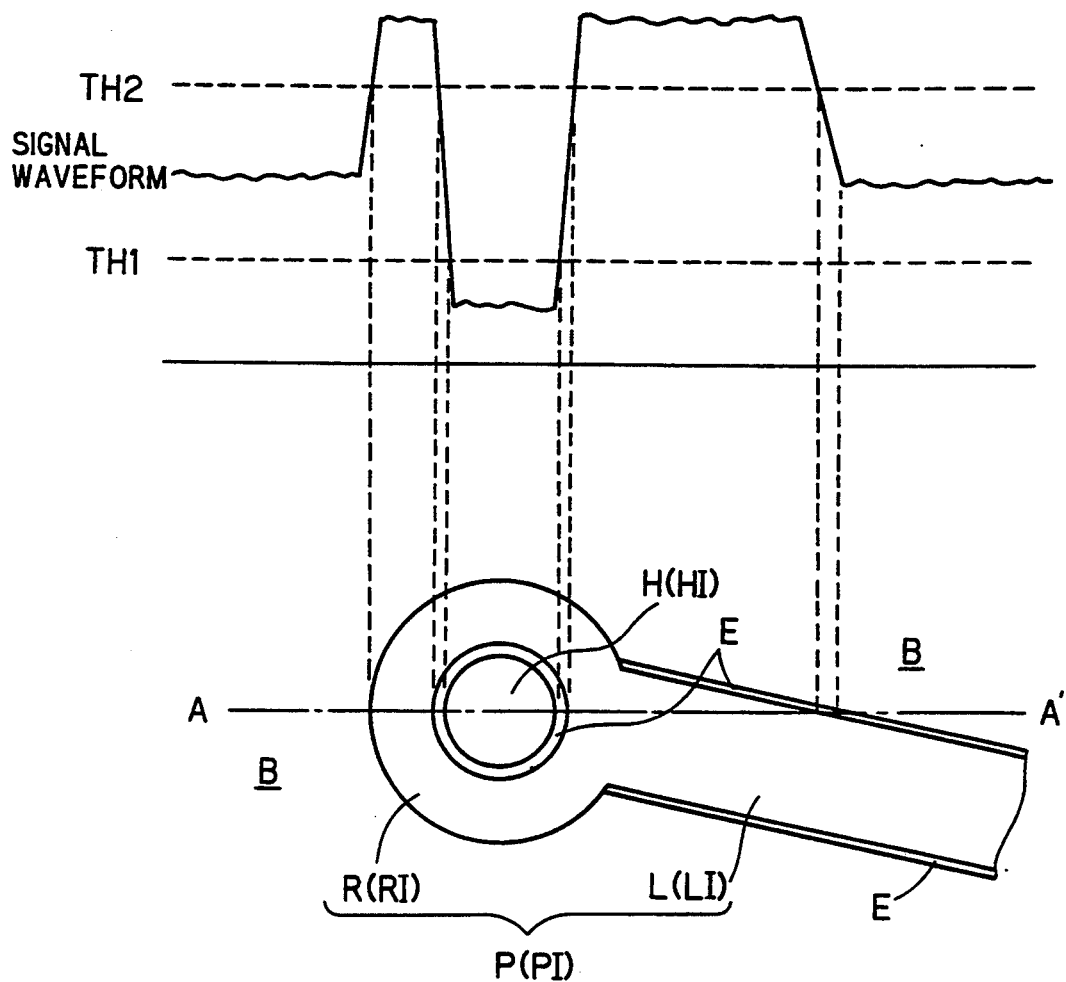
FIG. 4 illustrates a signal waveform obtained with an image scan reader shown in FIG. 3A and a wiring pattern obtained from the waveform.

FIG. 4 illustrates a graph showing a signal waveform obtained along a line A—A' in FIG. 3A and an exemplary pattern obtained by synthesizing respective signal waveforms for a two-dimensional area on the printed board 11.

As shown in the signal waveform of FIG. 4, the intensity of the reflected light is relatively weak in the area of base plate B, and the signal level thereof is between threshold values TH1 and TH2 (TH1<TH2). Since the wiring pattern P (the line L and the land R) is made of a metal such as copper, the intensity of the reflected light is higher on the wiring pattern, and the signal level thereof exceeds the higher threshold value TH2 . In the through hole H, substantially no light is reflected and a signal whose level is below the threshold value TH1 is obtained. Edges E are present between the through hole H and the land R as well as between the line L and the base B. Due to irregularities and inclination in the edges E, reflected light levels in these portions vary between the threshold values TH1 and TH2, so that quantization errors are often caused.

Signals from the image reader 20 are digitized in the digitizing circuits 21a and 21b shown in FIG. 2A, using the threshold values TH1 and TH2 respectively. The digitizing circuit 21a generates a signal representing a hole image HI corresponding to the through hole H, while the digitizing circuit 21b generates another signal representing a pattern image PI corresponding to the wiring pattern P consisting of the line L and the land R. These signals representing the images HI and PI are processed as described below.

Figure 3B:
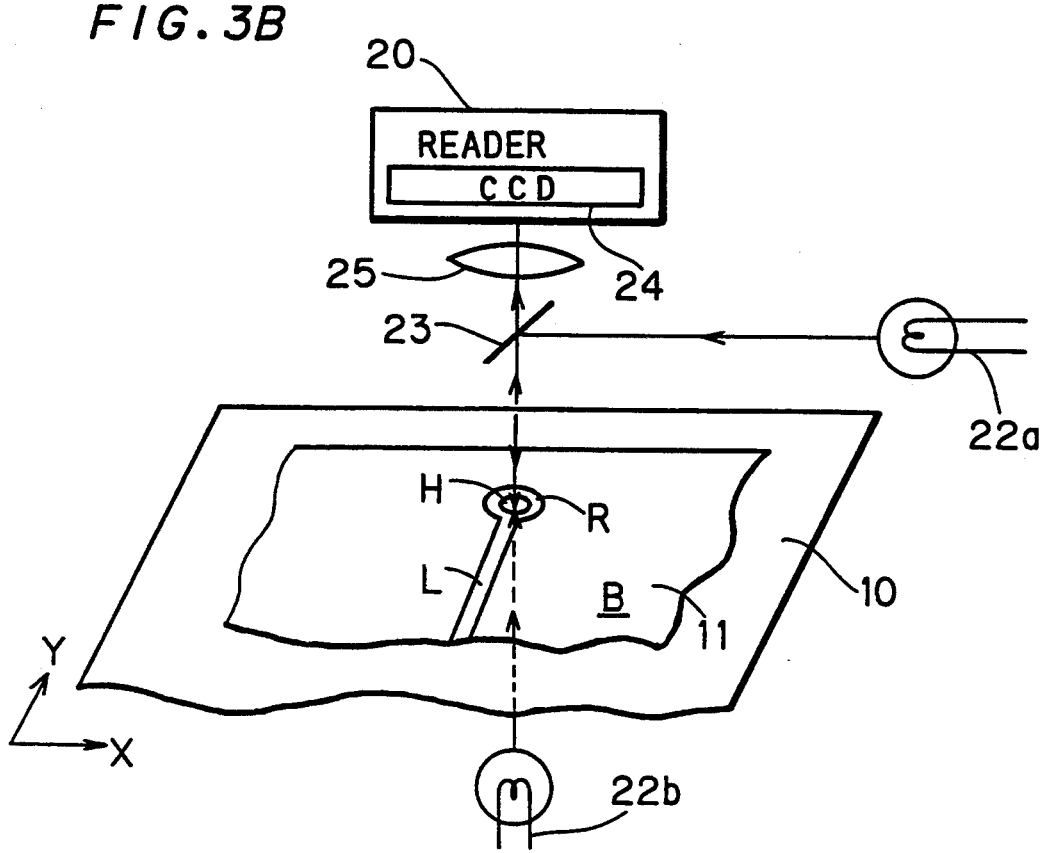

FIG. 3B shows another example of the reading optical system. Like the system shown in FIG. 3A, light from a light source 22a is applied onto the printed board 11 and a reflected light is incident on a CCD 24 in an image reader 20 through a half mirror 23 and a lens 25. In this example, another light source 22b is provided at the rear side of a stage 10, so that light passing through a through hole H is also received by the CCD 24. Therefore, the signal obtained in the CCD 24 is at the highest level in the through hole H, at an intermediate level in a wiring pattern P consisting of a line L and a land R, and at relatively low levels in a base plate B and edges E.

Alternatively, at least two linear arrays of CCDs 24 may be used. In this case, the wiring pattern P consisting of the line L and the land R is detected by the combination of the light source 22a and one of the two linear arrays of CCDs 24, while the through hole H is detected by the combination of the light source 22b and the other of the two linear arrays of CCDs 24. The image signals are delivered to respective binarizing circuits provided in a subsequent stage.

C. Pattern Inspection Circuit

FIG. 2B is a block diagram showing the internal structure of the pattern inspection circuit 30 shown in FIG. 2A.

The primary hole image signal $HIS_0$ and the primary pattern image signal $PIS_0$ obtained in the digitizing circuits 21a and 21b shown in FIG. 2A are supplied to noise filters 32a and 32b respectively through an interface 31. The noise filters 32a and 32b remove noises through smoothing processing, etc., to generate a hole image signal HIS and a pattern image signal PIS, respectively.

Both of the hole image signal HIS and the pattern image signal PIS are supplied to a comparative check circuit 33, a DRC (design rule check) circuit 34 and a through hole inspection circuit 35.

The comparative check circuit 33 is adapted to compare the hole image signal HIS and the pattern image signal PIS with image signals obtained for a reference printed board previously prepared, for specifying portions of the signals HIS and PIS which are different from the reference printed board. The reference printed board is of the same type as the printed board 11 to be inspected and has been previously determined to be nondefective.

The through hole inspection circuit 35 is adapted to detect relative positional relation between the land R and the hole H on the printed board 11 and decide whether or not the same deviates from a design value, thereby checking whether the printed board 11 is defective.

D. DRC Circuit

(D-1) Outline

Before explaining the structure and the operation of each part of the DRC circuit 34, the outline thereof is now described.

Figure 1A:
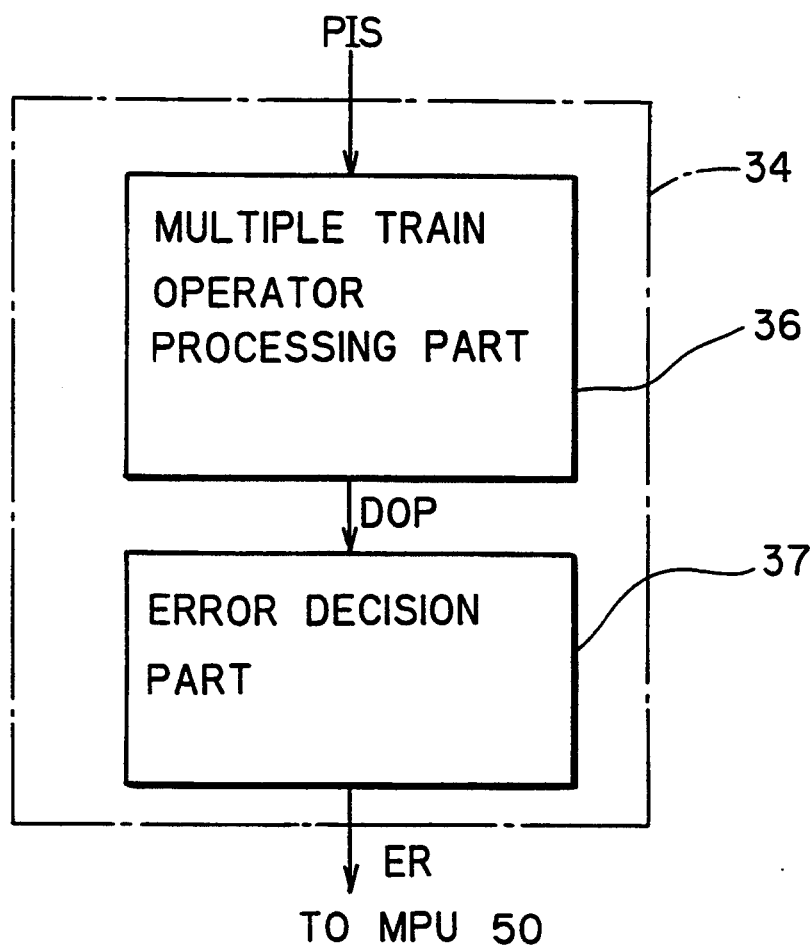
FIG. 1 is a block diagram showing the structure of a DRC circuit.
FIG. 1B is a flow chart showing operation flow of the DRC circuit 34.
Figure 1B:
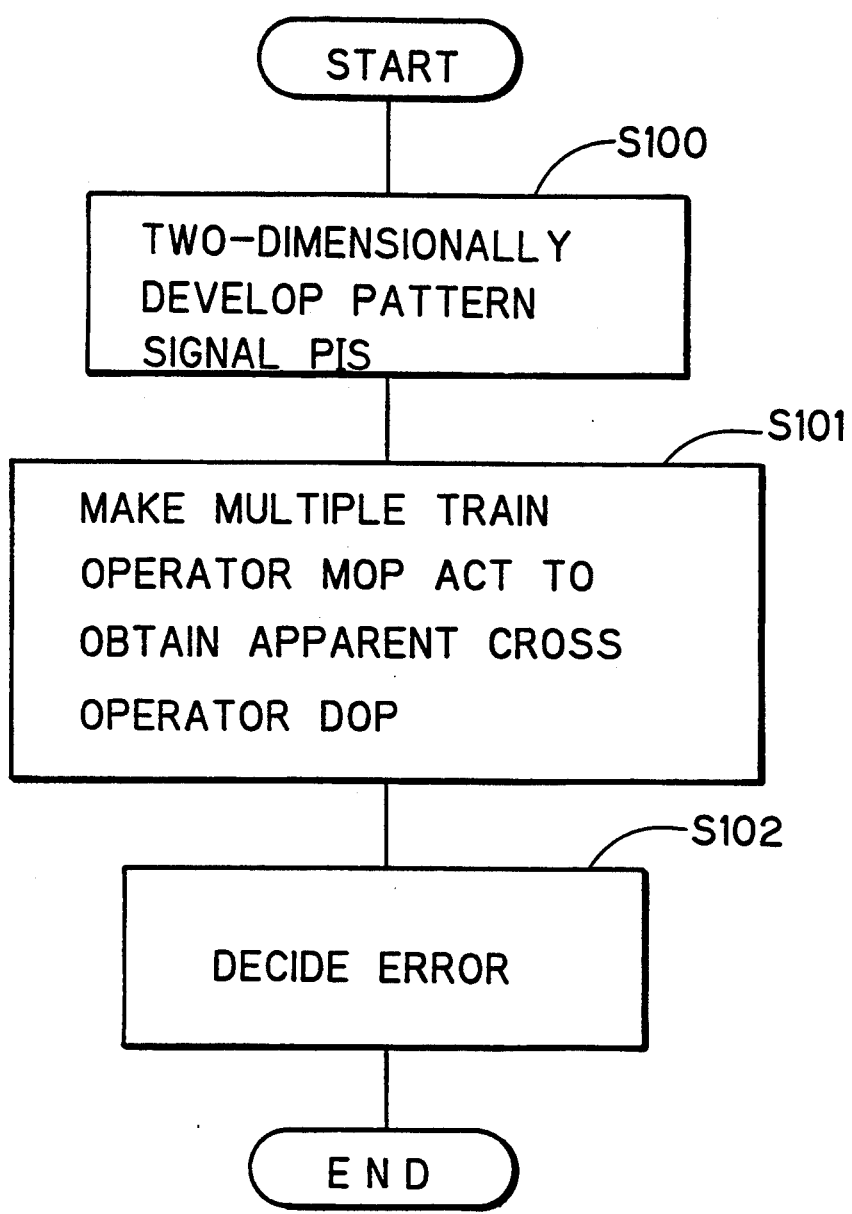

FIG. 1A is a block diagram showing the outline of the DRC circuit 34, and FIG. 1B is a flow chart showing the flow of the operation of this circuit 34.

Figure 6:
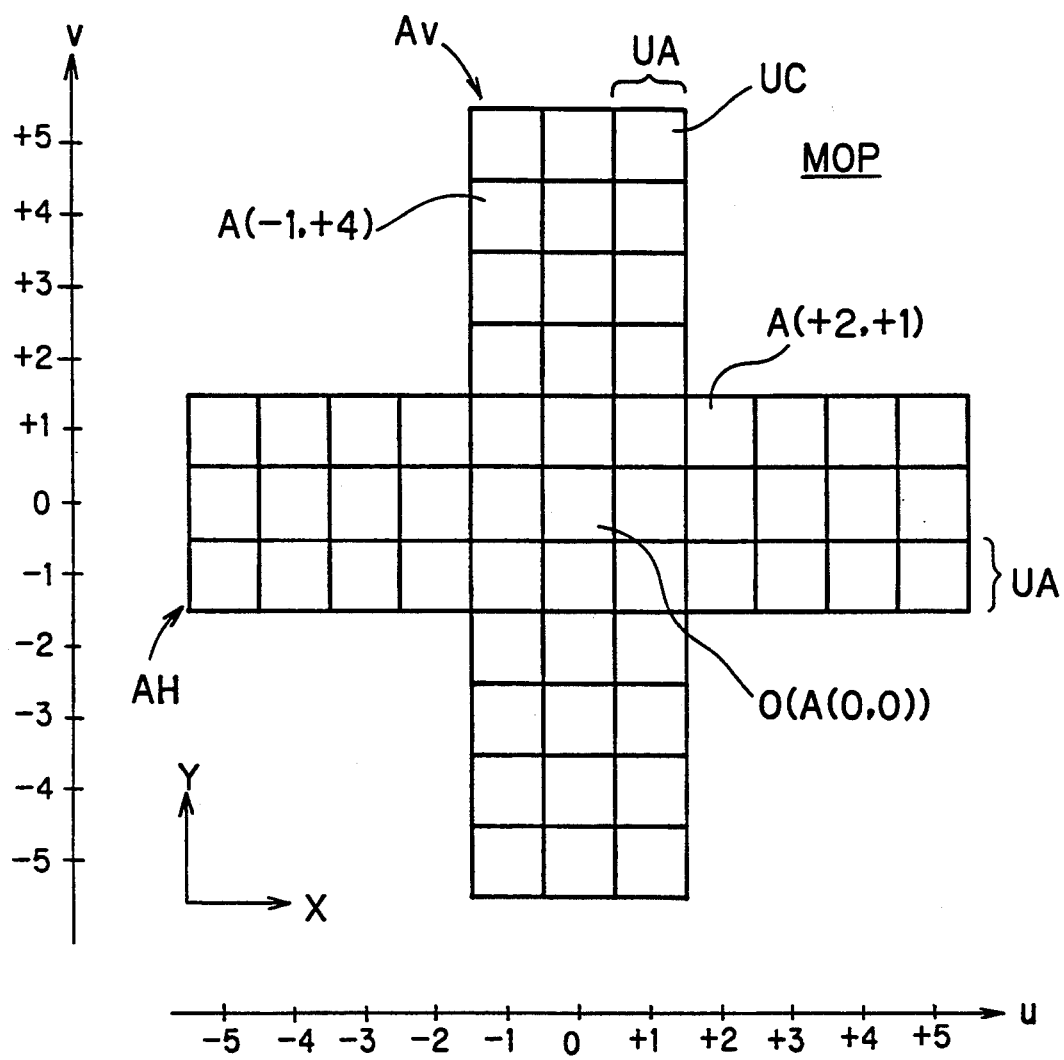
FIG. 6 is a conceptual diagram of the multiple train operator MOP.
Figure 7:
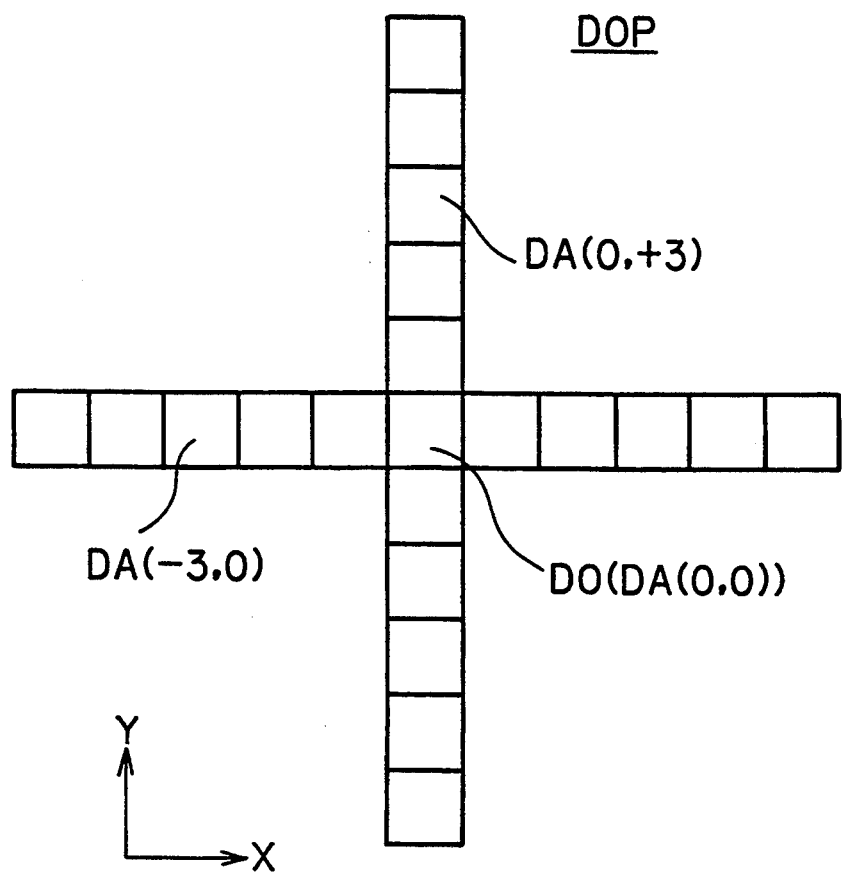
FIG. 7 is a conceptual diagram of an apparent cross operator DOP.

A multiple train operator processing part 36 is operable to conduct the process steps S100 and S101, in which a multiple train operator MOP (FIG. 6) is applied to the pattern image PI and the result of the operation is converted to digital data which is apparently in the same form as an apparent cross operator DOP (FIG. 7).

An error decision part 37 is operable to conduct the process step S102, in which the data in the form of the apparent cross operator DOP is received and pattern abnormality is detected. Since the data in the apparent cross operator form DOP has four parts, each consisting of a single train of binary data, the error decision part 37 may be the same circuit as for the conventional cross operator (FIGS. 14–18).

(D-2) Processing with Multiple Train Operator

Figure 5:
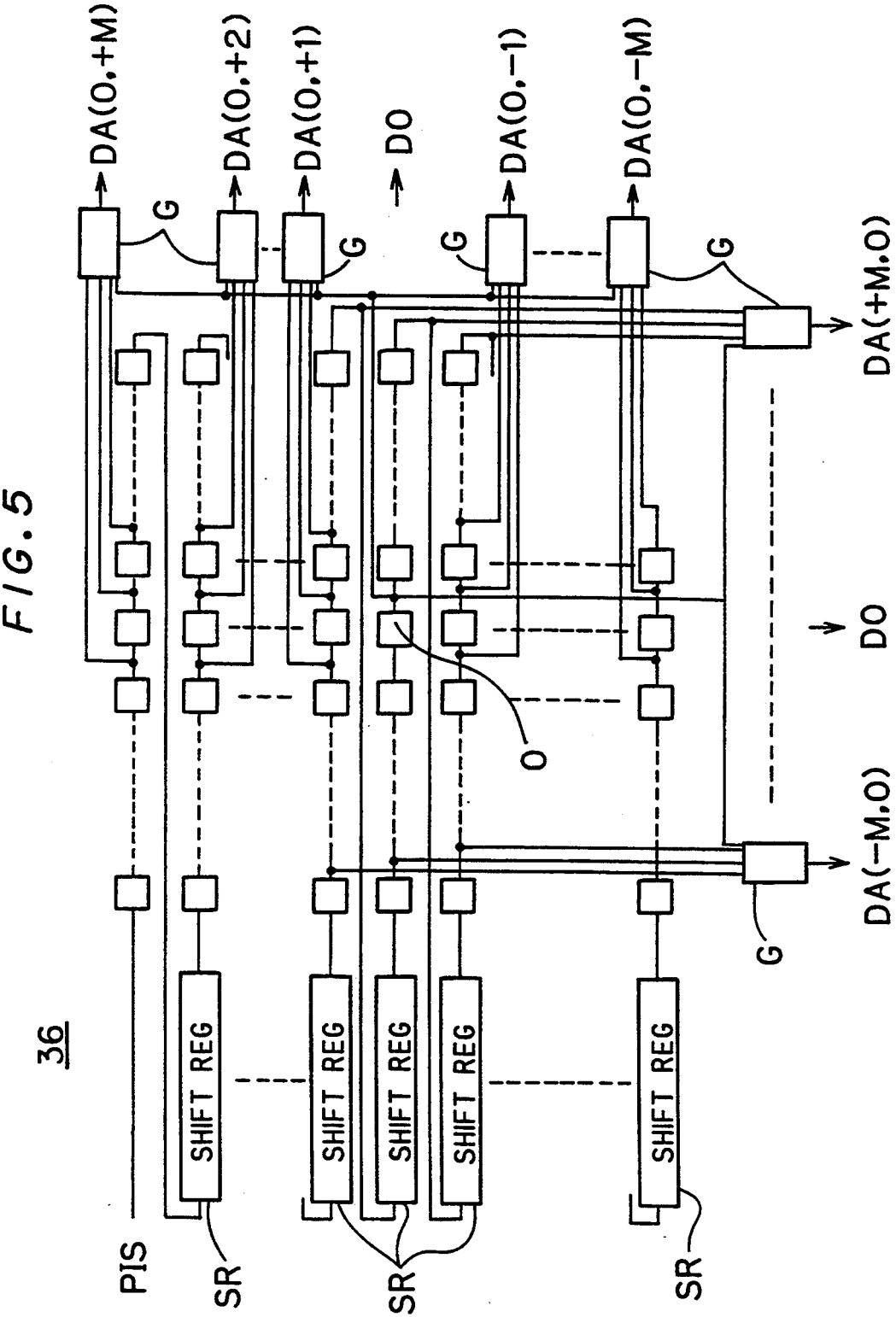
FIG. 5 is a block diagram showing the Structure of a multiple train operator processing part 36.

FIG. 5 shows the structure of the multiple train operator processing part 36. The image data represented by the pattern image signal PIS for respective scanning lines are arranged into two-dimensional data array or matrix with a set of one-line shift registers SR and a set of one-pixel shift registers which are represented by square blocks in FIG. 5. Respective outputs of the one-pixel shift registers in the central three columns and in the central three lows are extracted to be delivered to processing blocks G. The set of signals inputted to the processing blocks G are data representing the result of applying the multiple train operator MOP to the image data.

FIG. 6 shows the pixel arrangement in the multiple train operator MOP. The multiple train operator MOP consists of a horizontal arm $A_H$ and a vertical arm $A_V$ crossing each other and forming a radial operator pattern. Each arm is a multiple train arm consisting of three trains or unit arms UA of eleven pixels, and the crossing region is a pixel matrix consists of $3 \times 3 = 9$ pixels. The unit arm form a close bundle of pixel arms. The horizontal arm $A_H$ is parallel to the X-direction and the vertical arm $A_V$ is parallel to the Y-direction. Form another point of view, the operator MOP consists of a straight pair of horizontal multiple train arms, a straight pair of vertical multiple train arms and the crossing region corresponding to a pixel matrix consisting of $3 \times 3 = 9$ pixels.

The multiple train operator MOP is equivalent to a logical operator having a plurality of multiple train arms $A_H$ and $A_V$. Each of the multiple train arms $A_H$ and $A_V$ consists of a close bundle of unit arms UA. Respective unit cells UC in each unit arm UA is equivalent to a unit operator operable to extract a logical "1" level from the respective pixels in the image data and to provide a logical "0" level for the other pixels. In other words, each unit cell UC is equivalent to an AND circuit whose one input is a pixel image data and the other terminal is fixed to a logical "1" level.

Consider a coordinate system having a u axis and a v axis. The u axis is parallel to the X direction and the v axis is parallel to the Y direction. The origin is set at the center O. The unit of respective axis is the pixel width. Accordingly, each pixel in the operator MOP can be expressed in the form of A(u, v). For example, the pixel which is in a position of (+2) pixels in the X direction and (+1) pixel in the Y direction from the center O is expressed as A(+2, +1). The pixel which is in a position of (−1) pixel in the X direction and (+4) pixels in the Y direction from the center O is expressed as A(−1, +4). The center or origin O can be expressed as A(0, 0).

The processing part 36 is operable to apply the multiple train operator MOP to the image data for respective pixels to obtain a multiple cross array of binary data consisting of multiple train arms. The multiple cross array of binary data is converted by the processing blocks G into a single cross array of binary data corresponding to the apparent cross operator form DOP. The circuit structure of the blocks G will be described later. The operator form DOP can be also expressed in a similar manner as the multiple train operator MOP. As shown in FIG. 7, a pixel which is in a position of (−3) pixels from the center O in the X direction is expressed as DA(−3, 0), while a pixel which is in a position of (+3) pixels from the center O in the Y direction is expressed as DA(0, +3). Similarly to the case of the operator MOP, the center DO can also be expressed as DA(0, 0).

Figure 8:
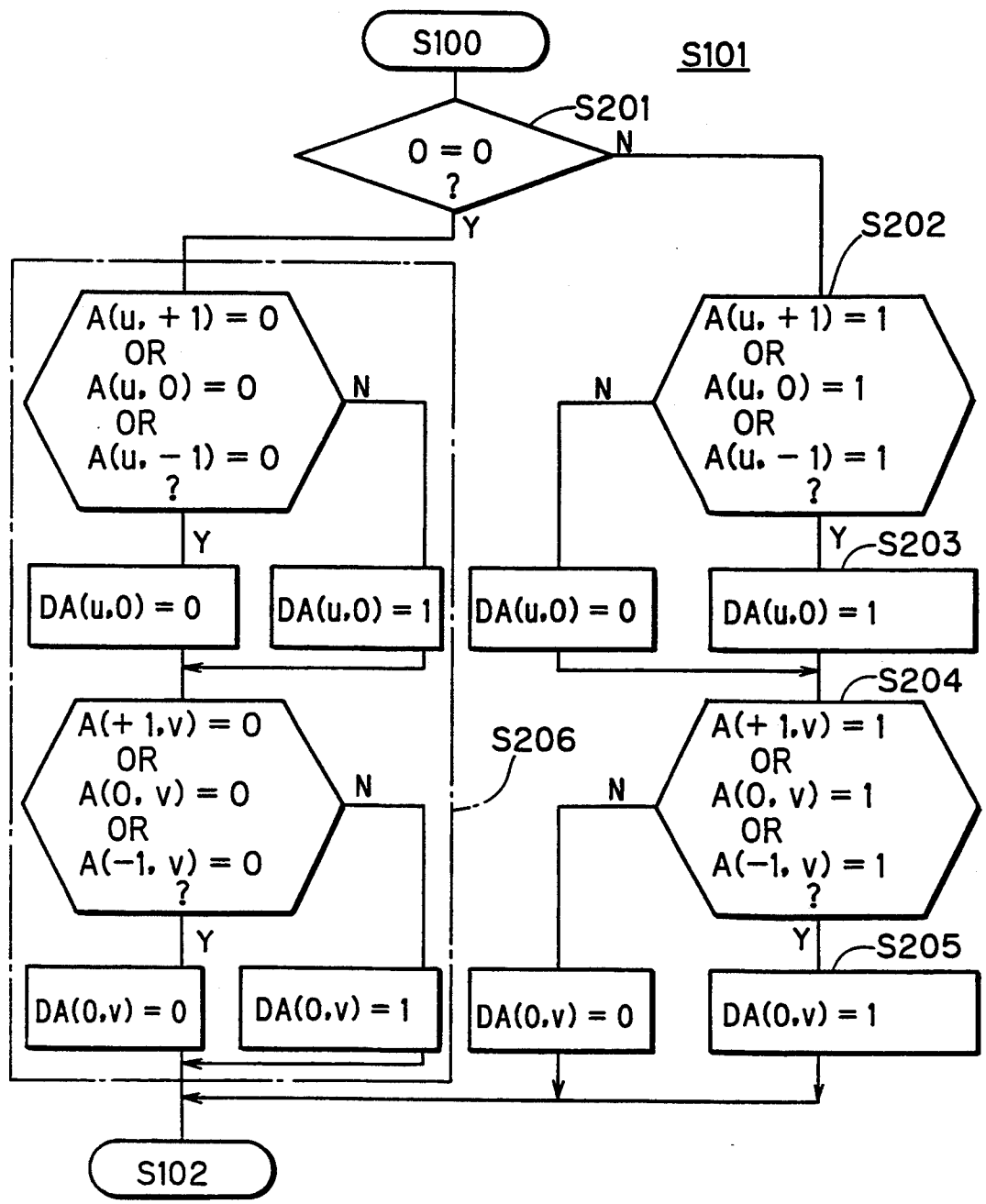
FIG. 8 is a flow chart for obtaining the apparent cross operator DOP from the multiple train operator MOP.

A technique of converting the result of applying the multiple train operator MOP to the image data into the cross operator form DOP is now described. FIG. 8 shows the step S101 of FIG. 1B in detail. First, it is determined whether a pixel on which the center O of the multiple train operator MOP acts is "0" or "1" (the process step S201). In the case shown in FIG. 10 in which quantization errors MIS are on the line L, the binary image data on the center pixel O is:

$$O(=A(0,0))=1 \qquad (1)$$

Thus, the process is advanced to the process step S202, to check whether or not the following expression (2) is true as to a certain u:

$$A(u,+1)+A(u,0)+A(u,-1)=1 \qquad (2)$$

where the symbol "+" indicates logical summation.

If the expression (2) is satisfied, the binary data:

$$DA(u,0)=1 \qquad (3)$$

is given to the pixel on the position u in the apparent cross operator DOP (the process step S203).

Figure 10:
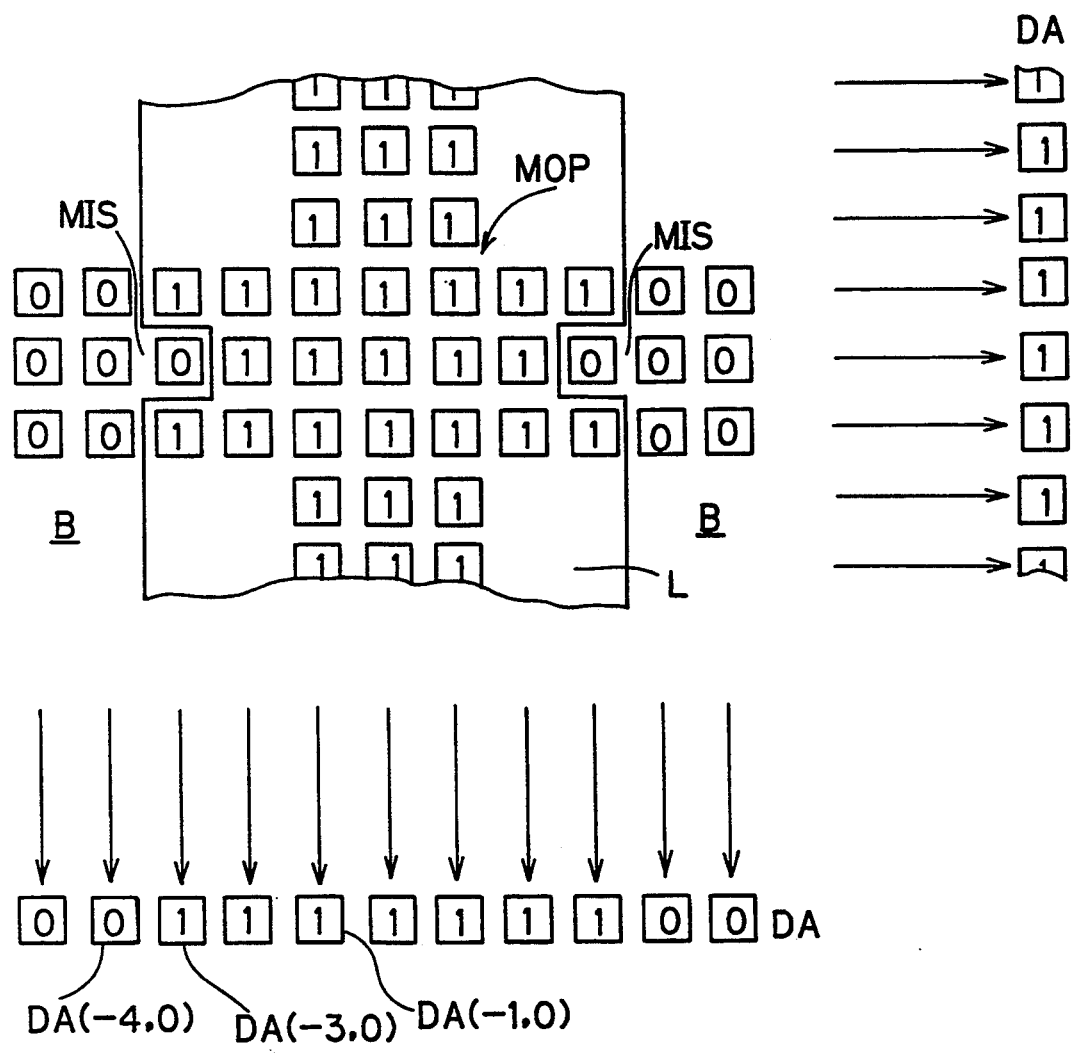
FIGS. 10 to 13 and FIG. 19 illustrate examples of the result of operation according to the preferred embodiment of the present invention.

In the example shown in FIG. 10, the following equation (4) is satisfied for the pixels on the base plate B.

$$A(-4,-1)=A(-4,0)=A(-4,+1)=0 \qquad (4)$$

Accordingly, the binary data:

$$DA(-4,0)=0 \qquad (5)$$

is given to the pixel $DA(-4,0)$.

In the vicinity of the center of the line L, the following equation (6) is satisfied and the equation (?) is obtained.

$$A(-1,-1)=A(-1,0)=A(-1,+1)=1 \qquad (6)$$

$$DA(-1,0)=1 \qquad (7)$$

In the portion where the quantization errors MIS are present, the equations:

$$A(-3,-1)=A(-3,+1)=1$$

$$A(-3,0)=1 \qquad (8)$$

are held, and therefore, the binary data:

$$DA(-3,0)=1 \qquad (9)$$

is given to the pixel $DA(-3,0)$ on the apparent cross operator form DOP, so that the quantization errors MIS disappear on the apparent cross operator form DOP.

Figure 12:
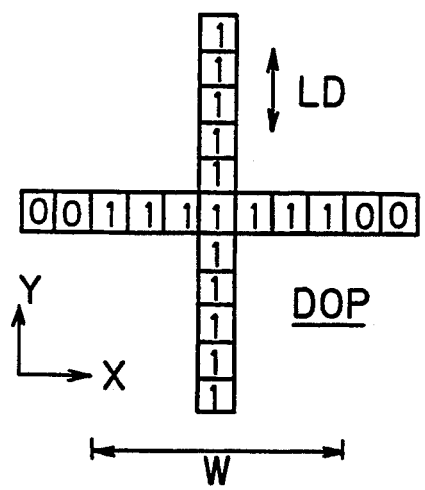

FIG. 12 shows an apparent cross operator DOP obtained as the result. No quantization errors appear on the apparent cross operator DOP, and a line L which has a width W and whose elongated direction LD is along the Y direction can be detected without influence of quantization errors, by counting the number of pixels of "1" which are continuously aligned in the direction X.

Figure 11:
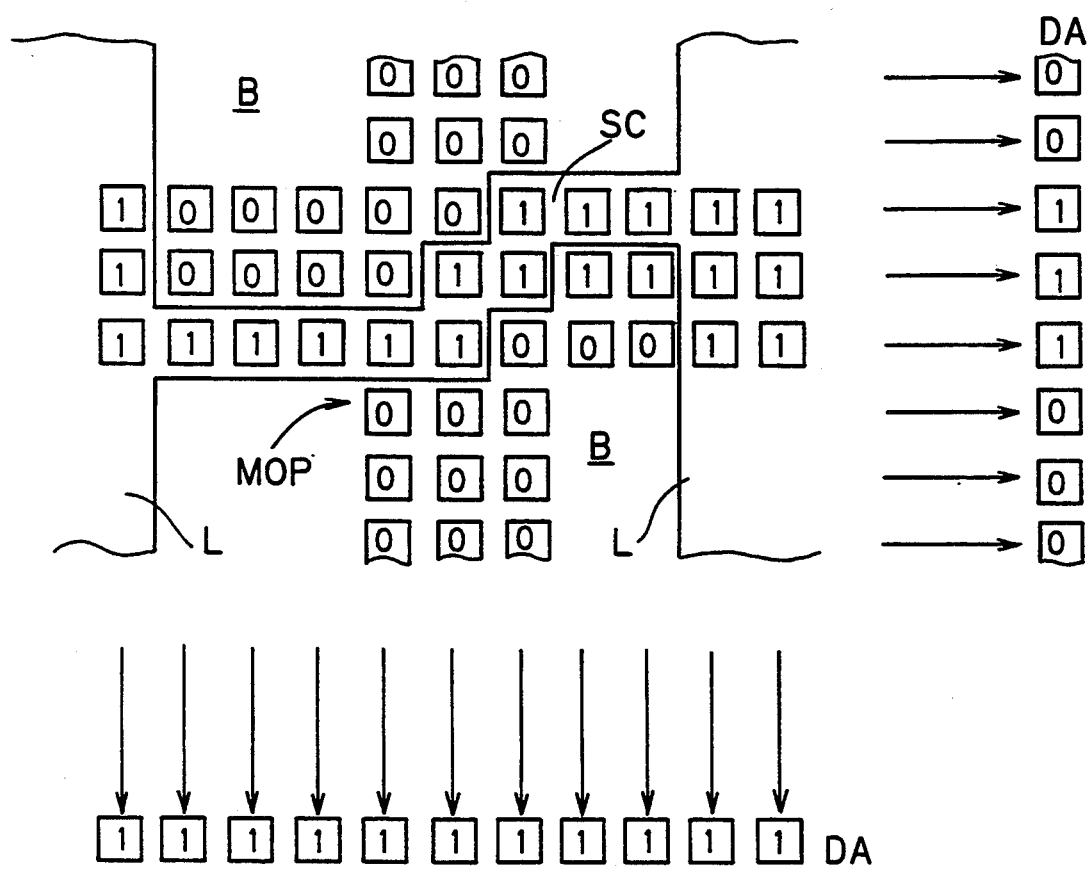

When a short circuit SC is present between two lines L as shown in FIG. 11, the following equation (10) for all values of u and the euqation (11) hold in the process steps S204 and S205.

$$DA(u,0)=1 \qquad (10)$$

$$DA(0,-1)=DA(0,0)=DA(0,+1)=1 \qquad (11)$$

Figure 13:
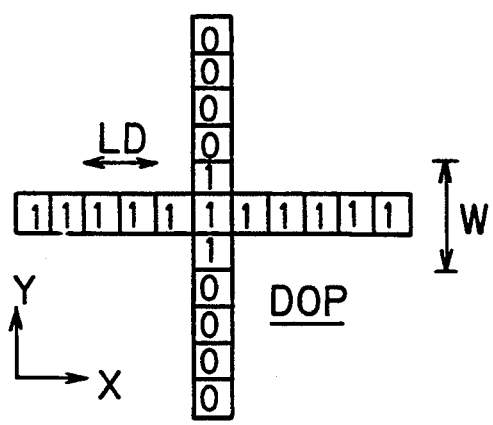

As a result, an operator form DOP of FIG. 13 is obtained as the presence of the short circuit SC and the width thereof can be detected.

While a case wherein the center O is "1" has been described above, this also applies to the case of that the center O is "0" (the process step S206).

Figure 19:
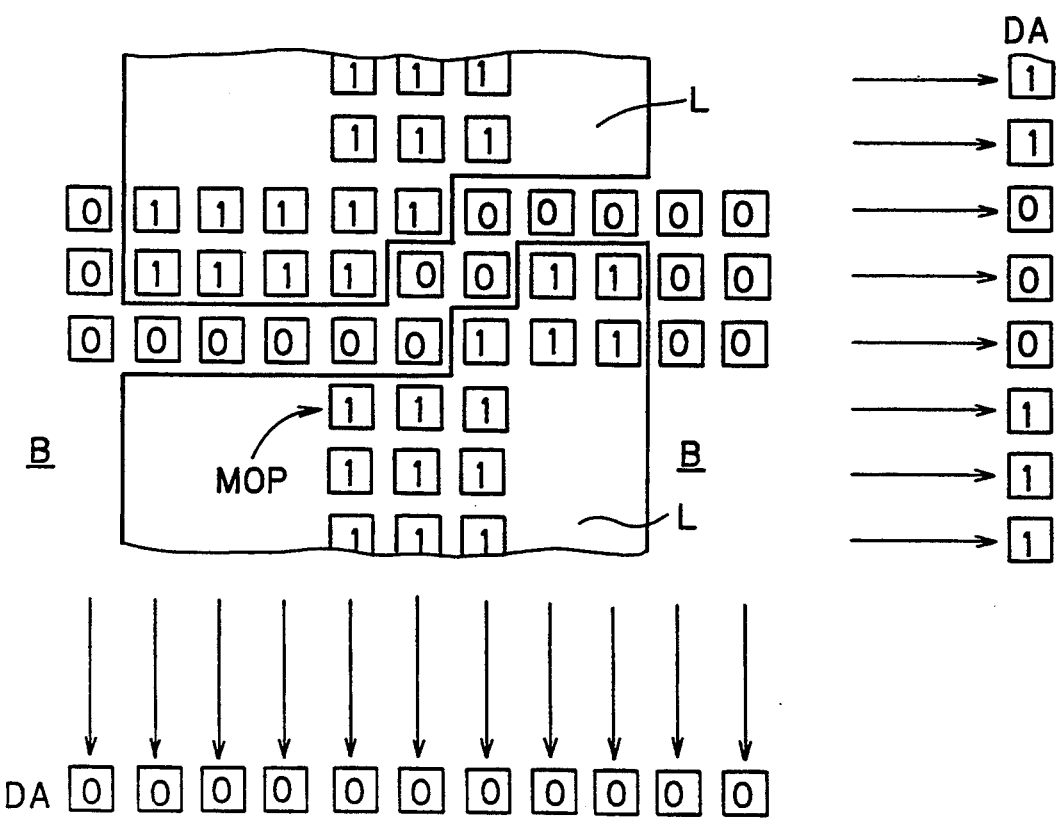

If a line L is disconnected or cut and the multiple train operator MOP acts on the disconnected portion as shown in FIG. 19, for example, the binary data in the apparent cross operator form DOP obtained from the multiple train operator MOP is given as the following equation (12) for all values of u, so that the disconnected portion is detected.

$$DA(u,0)=0 \qquad (12)$$

Namely, in the preferred embodiment, if at least one of cross-directionally adjacent three pixels of the operator MOP is "1" under the condition that the center O is "1", the corresponding pixel of the apparent cross operator DOP is given the logical value "1".

On the other hand, if at least one of cross-directionally adjacent three pixels of the operator MOP is "0" under the condition that the center O is "0", the corresponding pixel of the operator DOP is given the logical value "0".

Figure 9:
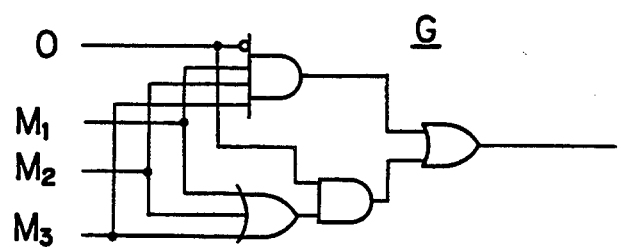
FIG. 9 is a block diagram showing a processing block G in FIG. 5.

The processings are conducted in the processing blocks G (FIG. 5). Each processing block G is provided with a combination of logic circuits shown in FIG. 9, for example, and its logical operation is as follows:

$$DO_I \times (M_1 \times M_2 \times M_3) + DO \times (M_1 + M_2 + M_3) \qquad (13)$$

where $M_1$, $M_2$ and $M_3$ represent the binary data on cross-directionally adjacent three pixels obtained through the multiple train operator MOP;

DO is the binary data on the center pixel O;

$DO_I$ is the inverse of the binary data $D_O$ on the center pixel O;

the symbol "x" represents logical product; and;

the symbol "+" represents logical summation

As to the value of the center DO of the operator DOP, the value of the center O of the operator MOP may be directly used without through the processing block G.

(D-3) Error Decision

A method of performing error decision using the data of the apparent cross oeprator DOP is now described/

First, cases of compensation of quantization errors and short-circuiting are described.

It is recognized whether the following expression (14) holds as to all u or all v among the data in the cross operator form DOP:

$$DA(u,v)=1 \qquad (14)$$

If the expression (14) holds as to all u, it is decided that the elongated direction LD of the line L is along the X direction. On the other hand, it is decided that the elongated direction LD of the line L is along the Y direction if the expression (14) holds as to all v. If the expression (14) holds for neither case, it is decided that no detection has been made as the line L.

Figure 14:
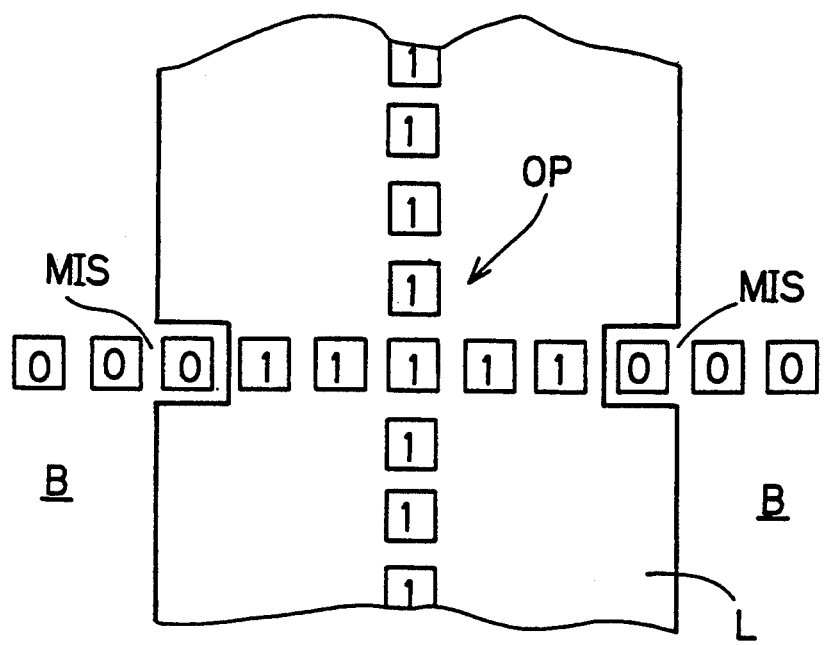
FIGS. 14 to 18 illustrate a conventional cross oparator.
Figure 15:
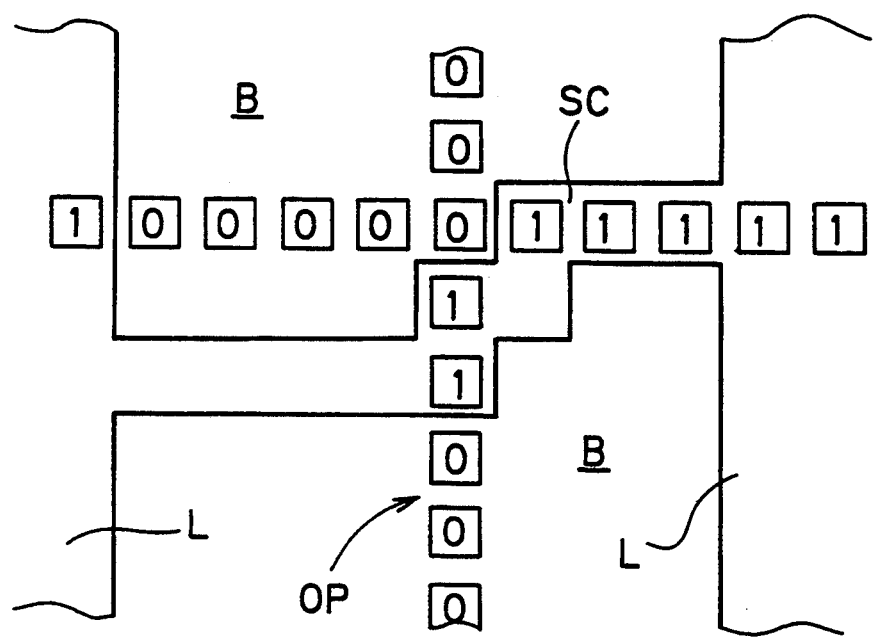
Figure 16:
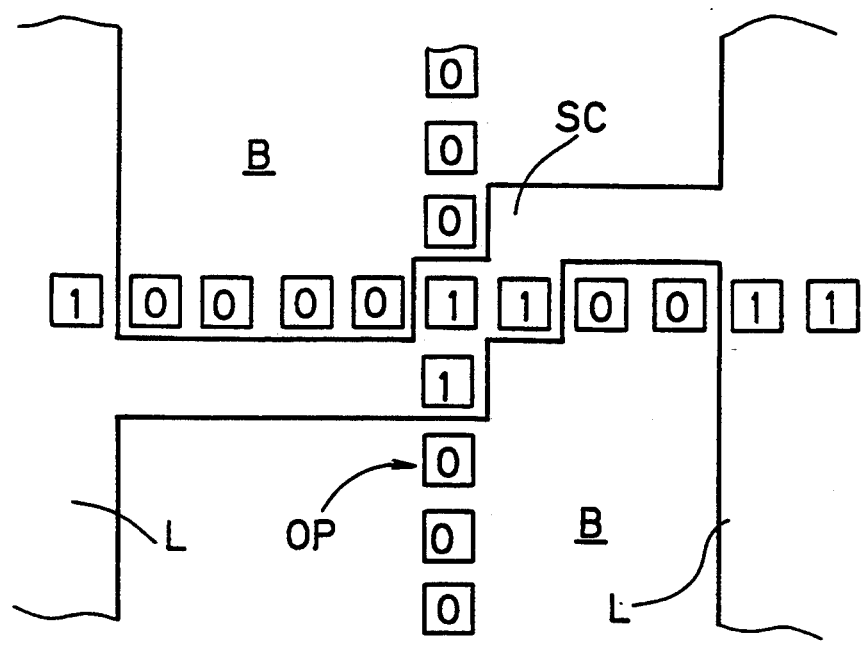
Figure 17:
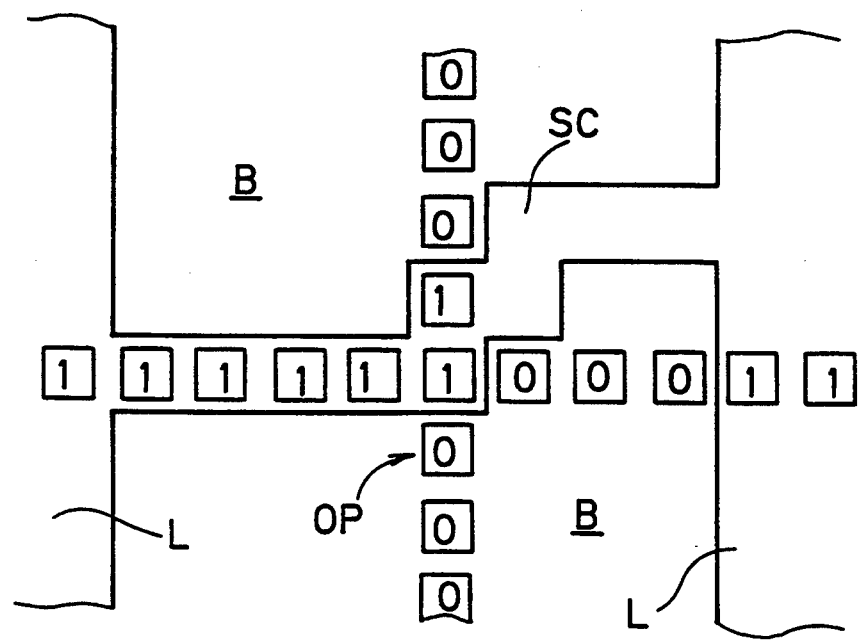
Figure 18:
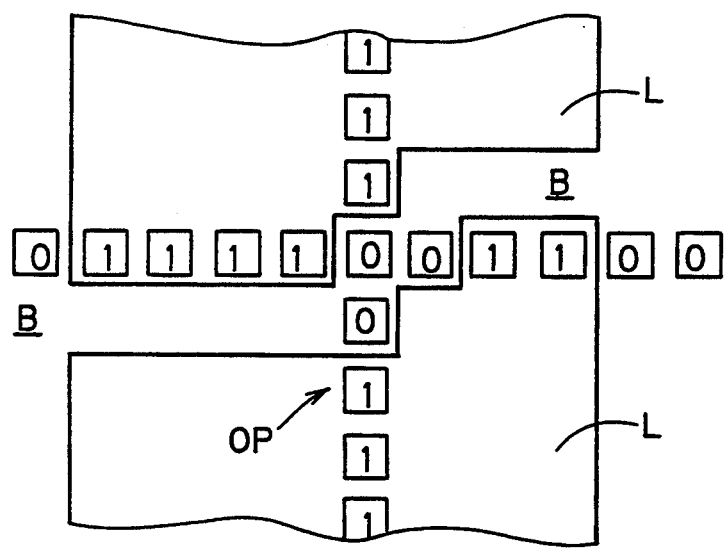

Upon such decision of the elongated or running direction LD of the line L, a direction perpendicular thereto is regarded as the cross direction on the line, and the number of continuous pixels having "1" is counted. Since the elongated direction LD of the line L is along the Y direction (v direction) as shown in FIG. 12 and seven pixels from DA(−3, 0) to DA(+3, 0) are continuously "1" in the X direction (u direction), it is decided that the width W of the line L is seven pixels. If there is no arithmetic processing using the multiple train operator MOP, the width W may be erroneously decided as five due to a quantization error as shown in FIG. 14, while such an erroneous decision can be avoided in this preferred embodiment by the processing as described in the section (D-2).

In the case of FIG. 13, it is decided that the elongated direction LD of the line L is along the X direction (u direction), and the width W of this line L is decided to be three since three pixels from DA(0, −1) to DA(0, +1) are continously "1" in the Y direction (v direction).

A minimum allowable value Wmin for the line width is set at four, for example, to provide such a criterion that a line L having a width smaller than the minimum allowable value Wmin is abnormal. Then, a portion decided as the line L here is regarded as abnormal (short-circuiting SC in this case), whereby the error decision part 37 outputs an error signal ER (FIG. 1A).

If there is slight disconnection as shown in FIG. 19, held are the expression (12) and the following expression (15) for the case where the center DO of "0".

$$DA(0,-2)=DA(0,+2)=1 \quad (15)$$

Thus, the disconnection is recognized and an error signal ER is outputted.

E. Modifications (1) The width of respective arms in the multiple train operator MOP may be any plural number of pixels, which is five, for example. When the width of respective arms is relatively wide, the effect of the present invention is enhanced in such a case where the short circuit SC and disconnection are obliquely formed with respect to the X direction and the Y direction. Further, the width of respective arms may be varied depending on the elongated directions of respective arms so as to reflect characters of the wiring pattern P.

Figure 20:
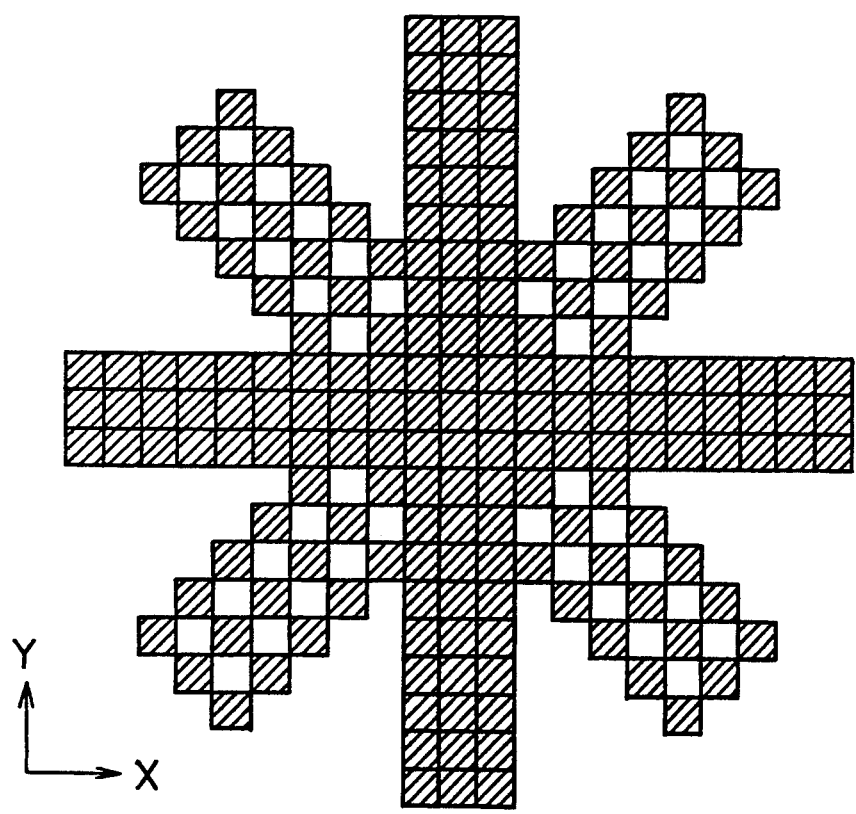
FIG. 20 illustrates an operator according to another preferred embodiment of the present invention.

(2) As shown in FIG. 20, the multiple train operator may have not only the horizontal and vertical arms but also other arms extending in the directions forming angles of 45° and 135° with the directions X and Y. In this case, the line L, the short circuit SC and/or disconnection extending at angles of 45° and 135° with respect to the X direction are easily detected. Similarly to the modification (1), the width of respective arms may be varied depending on the elongated directions of respective arms so as to reflect characters of the wiring pattern P.

While the invention has been shown and described in detail, the foregoing description is in all aspects illustrative and not restrictive. It is therefore understood that numerous modifications and variations can be devised without departing from the scope of the invention.

We claim:

1. A method of inspecting a wiring pattern formed on a printed board, comprising the steps of:
   (a) obtaining an image of said wiring pattern;
   (b) applying an image operator to said image to obtain a first data array, wherein said image operator has a plurality of operator arms each of which is formed of a plurality of pixel trains, and said first data array has a first plurality of data arms each of which is formed of a plurality of trains of data values, said step of applying an image operator including the steps of:
      (b-1) defining said image operator so that said plurality of pixel trains form a close bundle of parallel pixel trains;
      (b-2) serially selecting each pixel on said image; and
      (b-3) applying said image operator to said image while adjusting a center of said image operator to said each pixel of said image; and
   (c) converting said first data array into a second data array having a second plurality of data arms each of which is formed of a single train of data values, said converting step including the step of applying a logical operation on said plurality of trains of data values to obtain said single train of data values by:
      (c-1) determining a first type of logical operation and a second type of logical operation;
      (c-2) obtaining a data value of said image data at a center of said first data array which corresponds to said center of said image operator;
      (c-3) selecting one of said first and second types of logical operation as a function of said data value at said center of said first data array; and
      (c-4) applying said one of said first and second types of logical operation to said plurality of trains of data values to obtain said single train of data values; and
   (d) inspecting said wiring pattern as a function of said second data array.

2. The method of claim 1, wherein the step (b-1) comprises the step of:
   (b-1-1) defining said image operator so that said plurality of operator arms cross each other at said center of said image operator.

3. The method of claim 2, wherein the step (b-1-1) comprises the step of:
   defining said image operator so that said plurality of operator arms form a radial pattern.

4. The method of claim 2, wherein the step (d) comprises the steps of:
   (d-1) detecting a number of pixels which are aligned along an elongated direction of each arm in said second plurality of data arms and which have a same logical level; and
   (d-2) comparing said number of pixels with a threshold number to inspect said wiring pattern.

5. The method of claim 1, wherein the step (c-1-4) comprises the step of:
   applying said one of said first and second types of logical operation to each chain of pixel data values aligning in said plurality of data arms in respective directions traversing said plurality of data arms.

6. An apparatus for inspecting a wiring pattern formed on a printed board, comprising:
   (a) first means for obtaining an image of said wiring pattern;
   (b) second means for applying an image operator to said image to obtain a first data array, wherein said image operator has a plurality of operator arms each of which is formed of a plurality of pixel trains, and said first data array has a first plurality of data arms each of which is formed of a plurality of trains of data values, said second means including:
      (b-1) means for holding said image operator so that said plurality of pixel trains form a close bundle of parallel pixel trains; and (b-2) means for serially selecting each pixel on said image; and (b-3) means for delivering said image data to said means (b-1) to apply said image operator to said image while adjusting a center of said image operator to said each pixel of said image;

(c) third means for converting said first data array into a second data array having a second plurality of data arms each of which is formed of a single train of data values, said third means applying a logical operation to said plurality of trains of data values to obtain said single train of data values and comprising:

(c-1) means for obtaining a data value of said image data at a center of said first data array which corresponds to said center of said image operator;

(c-2) means for selecting one first and second types of logical operation as a function of said data value at said center of said first data array; and (c-3) means for applying said one of said first and second types of logical operation to said plurality of trains of data values to obtain said single train of data values; and (d) fourth means for inspecting said wiring pattern as a function of said second data array.

7. The apparatus of claim 6, wherein said means (b-1) comprises:

(b-1-1) means for holding said image operator so that said plurality of operator arms cross each other at said center of said image operator.

8. The apparatus of claim 7, wherein said means (b-1-1) comprises:

means for holding said image operator so that said plurality of operator arms form a radial pattern.

9. The apparatus of claim 6, wherein said means (c-1-3) comprises:

means for applying said one of said first and second types of logical operation to each chain of pixel data values aligning in said plurality of data arms in respective directions traversing said plurality of data arms.

10. The apparatus of claim 9, wherein said means (d) comprises:

(d-1) means for detecting a number of pixels which are aligned along an elongated direction of each arm in said second plurality of data arms and which have a same logical level; and (d-2) means for comparing said number of pixels with a threshold number to inspect said wiring pattern.

* * * * *